United States Patent
Ahn et al.

(10) Patent No.: US 11,731,087 B2
(45) Date of Patent: Aug. 22, 2023

(54) POLYMER COMPOSITION CONTAINING SULFONATED CARBON NANOTUBE AND SULFONATED GRAPHENE OXIDE FOR FABRICATING HYDROPHILIC SEPARATION MEMBRANE

(71) Applicant: RESEARCH COOPERATION FOUNDATION OF YEUNGNAM UNIVERSITY, Gyeongsangbuk-do (KR)

(72) Inventors: Young Ho Ahn, Gyeongsangbuk-do (KR); Sivasankaran Ayyaru, Gyeongsangbuk-do (KR)

(73) Assignee: RESEARCH COOPERATION FOUNDATION OF YEUNGNAM UNIVERSITY, Gyeongsangbuk-do (KR)

( * ) Notice: Subject to any disclaimer, the term of this patent is extended or adjusted under 35 U.S.C. 154(b) by 824 days.

(21) Appl. No.: 16/341,266

(22) PCT Filed: Dec. 27, 2016

(86) PCT No.: PCT/KR2016/015330
§ 371 (c)(1),
(2) Date: Apr. 11, 2019

(87) PCT Pub. No.: WO2018/070616
PCT Pub. Date: Apr. 19, 2018

(65) Prior Publication Data
US 2020/0376445 A1    Dec. 3, 2020

(30) Foreign Application Priority Data
Oct. 13, 2016  (KR) .................. 10-2016-0132523

(51) Int. Cl.
| | | |
|---|---|---|
| B01D 71/34 | (2006.01) | |
| C08K 3/04 | (2006.01) | |
| C01B 32/174 | (2017.01) | |
| C01B 32/23 | (2017.01) | |
| C01B 32/198 | (2017.01) | |
| B01D 61/14 | (2006.01) | |
| B01D 67/00 | (2006.01) | |
| B01D 69/02 | (2006.01) | |
| C02F 1/44 | (2023.01) | |
| C08J 5/22 | (2006.01) | |
| C08K 3/06 | (2006.01) | |
| C08K 9/02 | (2006.01) | |
| C08L 27/16 | (2006.01) | |
| C08L 27/24 | (2006.01) | |

(52) U.S. Cl.
CPC ........... B01D 71/34 (2013.01); B01D 61/145 (2013.01); B01D 67/0011 (2013.01); B01D 67/0016 (2013.01); B01D 69/02 (2013.01); C01B 32/174 (2017.08); C01B 32/198 (2017.08); C01B 32/23 (2017.08); C02F 1/444 (2013.01); C08J 5/2268 (2013.01); C08K 3/041 (2017.05); C08K 3/042 (2017.05); C08K 3/06 (2013.01); C08K 9/02 (2013.01); C08L 27/16 (2013.01); C08L 27/24 (2013.01); *B01D 2325/36* (2013.01); *C01B 2202/06* (2013.01); *C08K 2201/011* (2013.01)

(58) Field of Classification Search
None
See application file for complete search history.

(56) References Cited

U.S. PATENT DOCUMENTS

2015/0087858 A1*  3/2015  Ci .................. C09D 11/52
                                                    252/500

FOREIGN PATENT DOCUMENTS

| CN | 105582821 A | | 5/2016 | |
|---|---|---|---|---|
| CN | 105688690 A | * | 6/2016 | ......... B01D 67/0079 |
| KR | 10-2014-0048748 A | | 4/2014 | |

OTHER PUBLICATIONS

Zhang et al. "Synergetic effects of oxidized carbon nanotubes and graphene oxide on fouling control and anti-fouling mechanism of polyvinylidene fluoride ultrafiltration membranes" (Journal of Membrane Science, 448, 2013, p. 81-92). (Year: 2013).*
Breite et al. "Tailoring Membrane Surface Charges: A Novel Study on Electrostatic Interactions during Membrane Fouling" (Polymers, 2015, 7, p. 2017-2030) (Year: 2015).*
Jiguo Zhang et al., entitled, "Synergetic Effects of Oxidized Carbon Nanotubes and Graphene Oxide on Fouling Control and Anti-Fouling Mechansim of Polyvinylidene Flouroide Ultrafiltration Membranes," Journal of Membrane Science 448, (2013), pp. 81-92.
International Search Report for Application No. PCT/KR2016/015330, dated Aug. 30, 2017, 2 pages.

* cited by examiner

*Primary Examiner* — Ryan B Huang
(74) *Attorney, Agent, or Firm* — Nixon Peabody LLP

(57) ABSTRACT

The present invention relates to a hydrophilic separation membrane polymer composition containing a sulfonated graphene oxide and a sulfonated carbon nanotube, and a hydrophilic separation membrane fabricated therefrom. A hydrophilic separation membrane according to the present invention has the advantage of being very high in water permeability and excellent in anti-fouling properties.

9 Claims, 4 Drawing Sheets

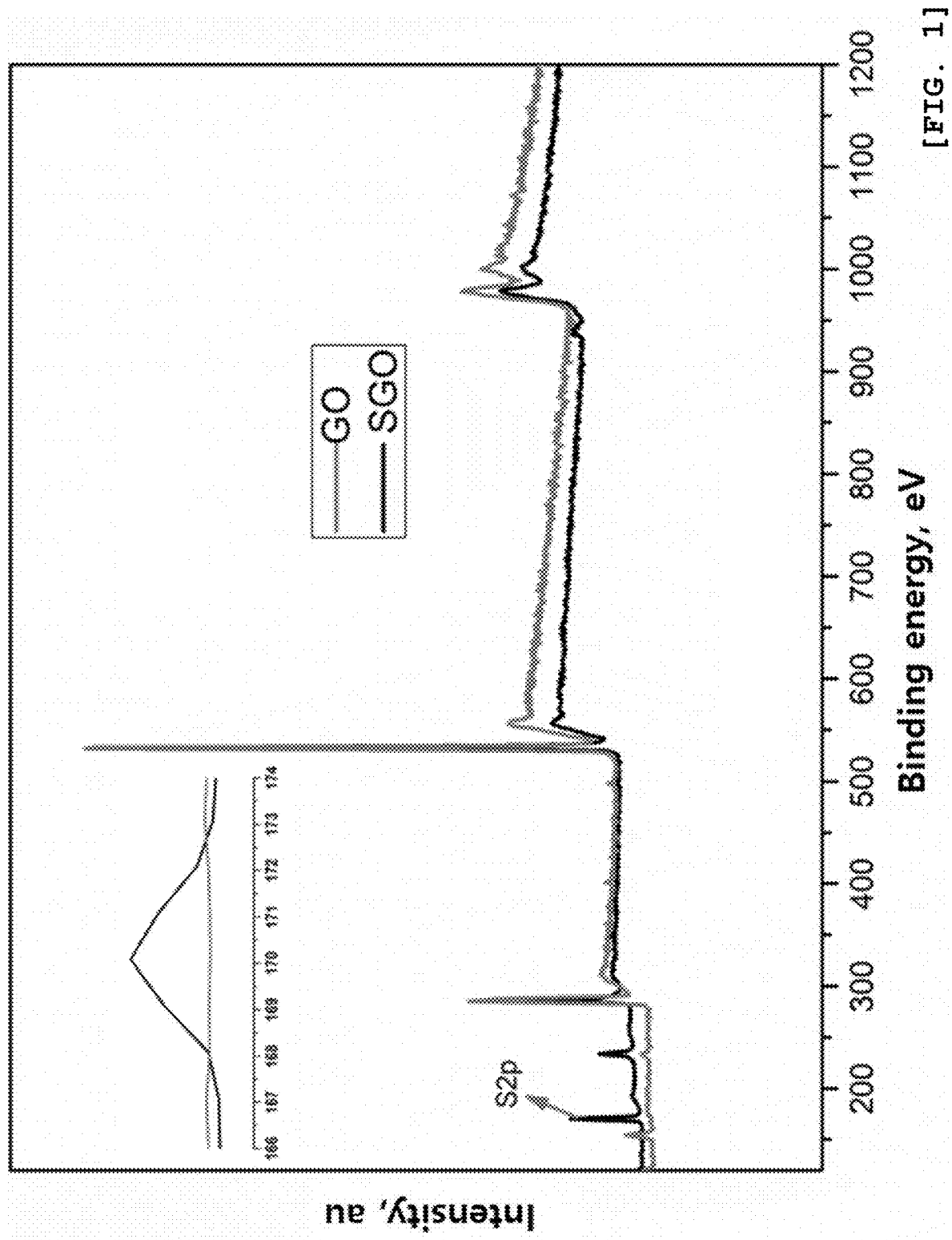
[FIG. 1]

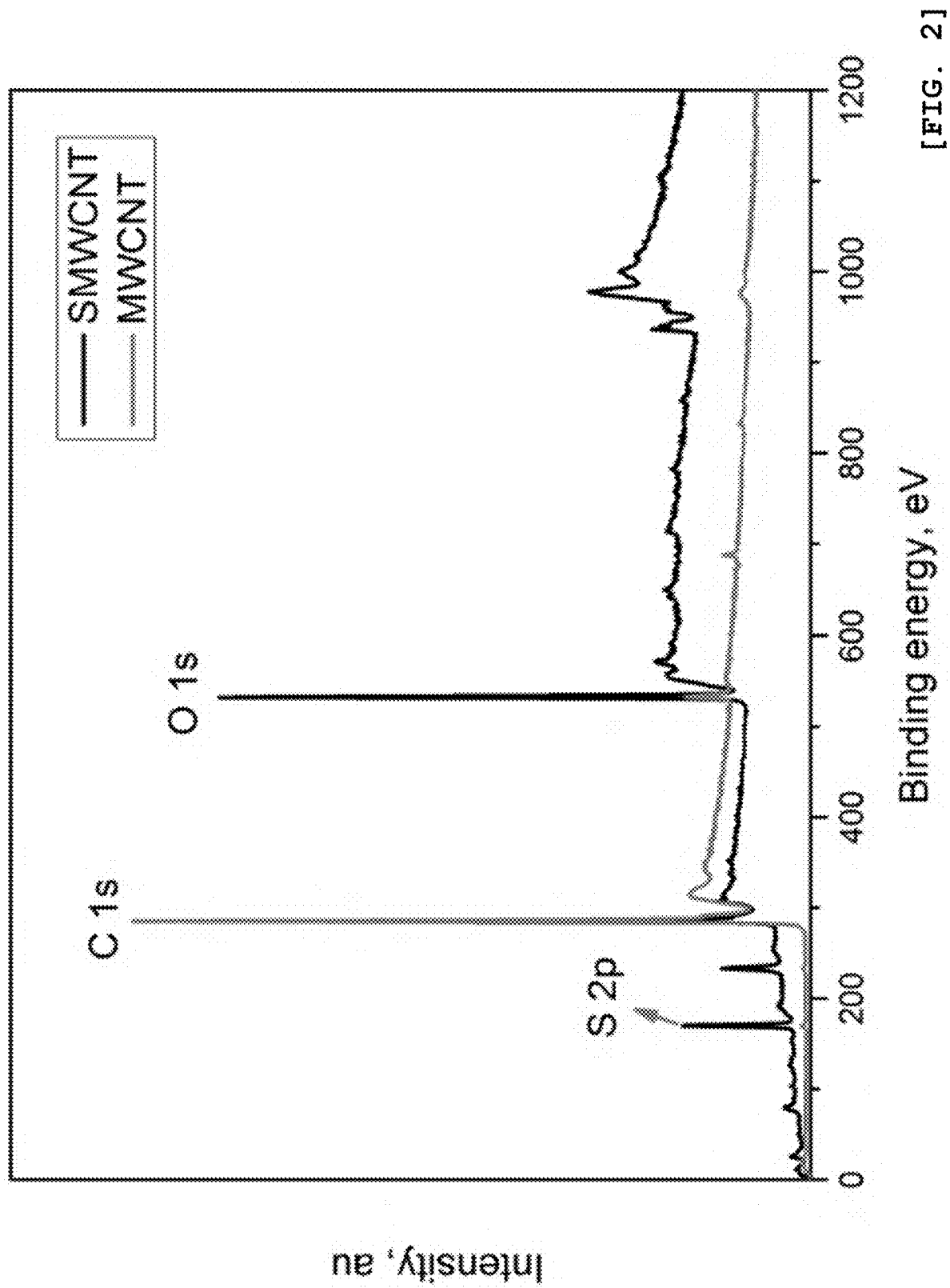
[FIG. 2]

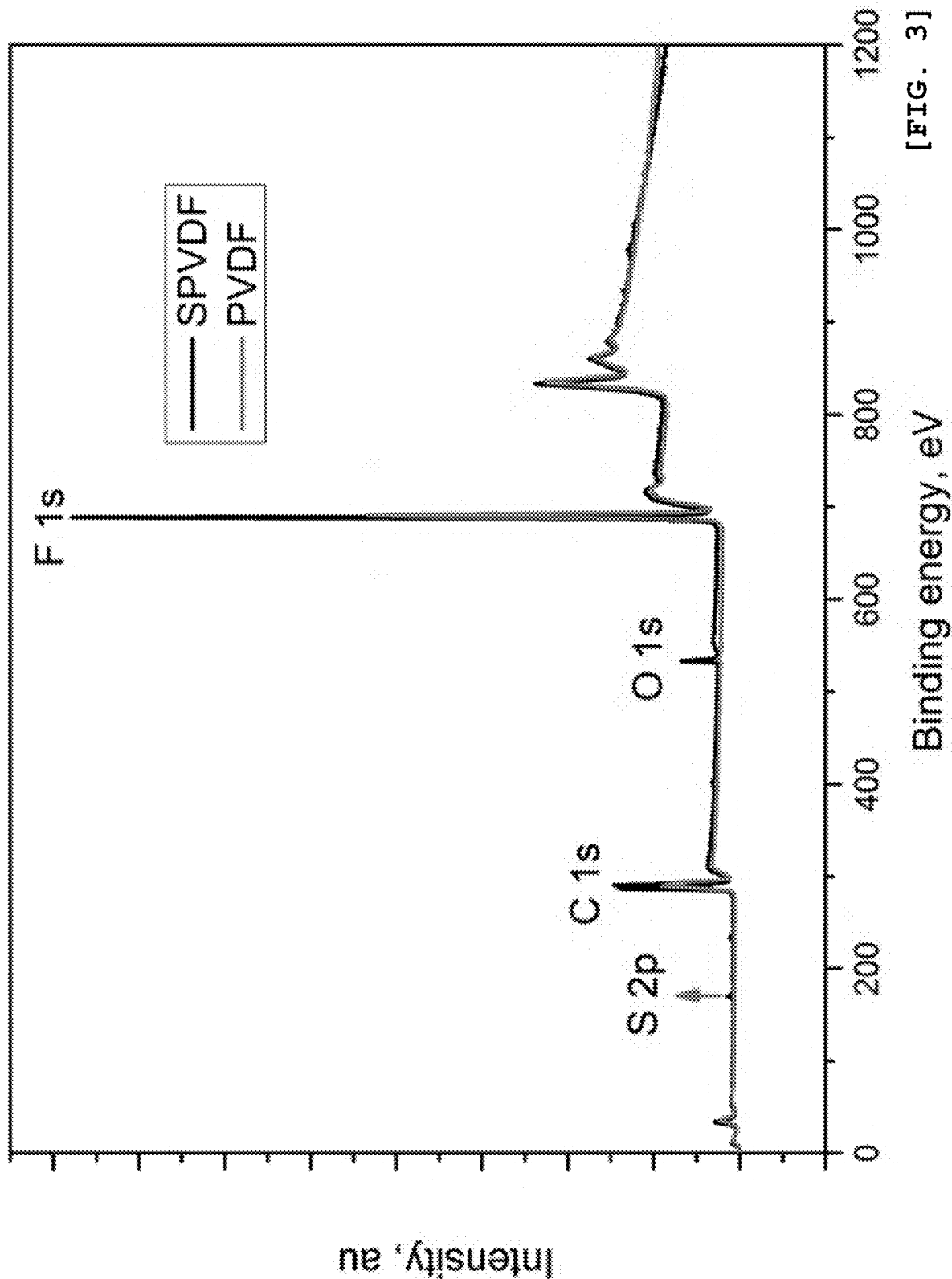
[FIG. 3]

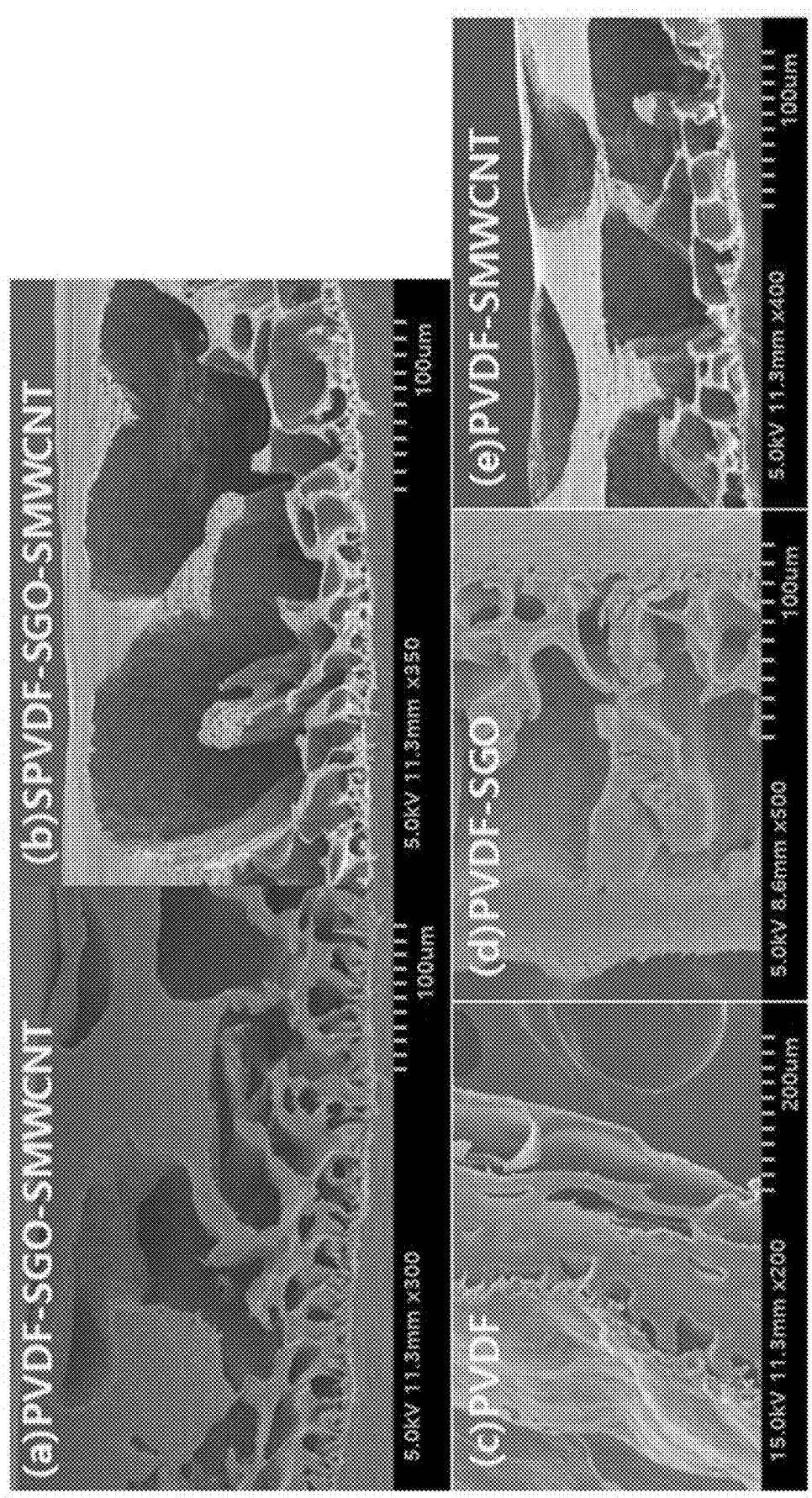
[FIG. 4]

POLYMER COMPOSITION CONTAINING SULFONATED CARBON NANOTUBE AND SULFONATED GRAPHENE OXIDE FOR FABRICATING HYDROPHILIC SEPARATION MEMBRANE

CROSS-REFERENCE TO RELATED APPLICATIONS

This application is the U.S. National stage of International Application PCT/KR2016/015330, filed Dec. 27, 2016, claiming benefit of Korean patent application 10-2016-0132523, filed Oct. 13, 2016, the entire disclosures of which are herein incorporated by reference.

TECHNICAL FIELD

The present invention relates to an ultrafiltration membrane including a sulfonated graphene oxide and sulfonated carbon nanotubes, which has excellent hydrophilicity, an excellent antifouling property, and high porosity.

BACKGROUND ART

Recently, a separation membrane for water treatment has received attention as technology for treating water by an environmental-friendly method, and the separation membrane is applied to various water treatment fields such as domestic waste water treatment, industrial water waste treatment, ultrapure water manufacture, and desalination of seawater. The separation membrane for water treatment is largely classified into a fine filtration membrane, an ultrafiltration membrane, a hollow fiber membrane, a nanofiltration membrane, or a reverse osmotic membrane, and if necessary, these membranes are used in combination.

The separation membrane for water treatment may be largely classified into a separation membrane using a cellulose-based hydrophilic polymer such as cellulose acetate or cellulose nitrate, and a separation membrane using a hydrophobic polymer such as polyethylene, polypropylene, polysulfone, polyethersulfone, polyvinylidene fluoride, or polytetrafluoroethylene.

The hydrophilic polymer has an advantage in that its interaction with a water molecule is active due to a hydrogen bond and the like, whereby water is easily permeated thereto to have a high water flux; however, the hydrophilic polymer has problems in that the hydrophilic polymer is susceptible to heat or chemicals and the polymer chain thereof is easily separated by an enzyme or the like contained in a fluid to be treated thereby destroying the membrane.

The hydrophobic polymer has advantages in that resistance to heat, chemicals, or the like is strong and physical properties such as mechanical strength are excellent; however, the hydrophobic polymer has problems in that its water flux is significantly low due to hydrophobicity and the hydrophobic polymer is more easily contaminated by a pollutant such as protein than the hydrophilic polymer is. In order to solve the problems of the hydrophobic polymer, various methods such as including inorganic particles such as titanium dioxide or surface-treated graphene oxide when preparing a separation membrane, treating a surface of the separation membrane with a functional group such as a carboxyl group, or treating a hydrophilic polymer such as polyvinyl alcohol are used. However, even in these methods, since the hydrophilicity of the separation membrane is still relatively low, the separation membrane has a low water flux and is vulnerable to pollution.

Chinese Patent Laid-Open Publication No. 105582821 also suggests a separation membrane including sulfonated graphene oxide for improving hydrophilicity of the separation membrane; however, there is still a limitation on significantly improving a processing capacity in a water treatment facility.

DISCLOSURE

Technical Problem

The present invention is to solve the above-mentioned problem.

An object of the present invention is to provide a polymer composition for preparing a hydrophilic separation membrane having high hydrophilicity.

Another object of the present invention is to provide a polymer composition for preparing a hydrophilic separation membrane having a high water flux.

Another object of the present invention is to provide a polymer composition for preparing a hydrophilic separation membrane having an excellent antifouling property.

Still another object of the present invention is to provide a polymer composition for preparing a hydrophilic separation membrane having high porosity.

Technical Solution

In one general aspect, a polymer composition for preparing a hydrophilic separation membrane includes a sulfonated graphene oxide and sulfonated carbon nanotubes.

In the polymer composition for preparing a hydrophilic separation membrane according to an exemplary embodiment of the present invention, the sulfonated graphene oxide may have an atomic ratio of a sulfur atom relative to a carbon atom on a surface thereof being 10 to 40%.

In the polymer composition for preparing a hydrophilic separation membrane according to an exemplary embodiment of the present invention, the sulfonated carbon nanotubes may have an atomic ratio of a sulfur atom relative to a carbon atom on a surface of the carbon nanotubes being 10 to 40%.

In the polymer composition for preparing a hydrophilic separation membrane according to an exemplary embodiment of the present invention, the sulfonated carbon nanotubes may be sulfonated multi-walled carbon nanotubes.

In the polymer composition for preparing a hydrophilic separation membrane according to an exemplary embodiment of the present invention, a base resin may be one or two or more selected from the group consisting of a hydrophobic halogenated polymer, a hydrophobic polysulfone-based polymer, and a hydrophobic polyolefin-based polymer.

In the polymer composition for preparing a hydrophilic separation membrane according to an exemplary embodiment of the present invention, the base resin may be sulfonated polyvinylidene fluoride.

The polymer composition for preparing a hydrophilic separation membrane according to an exemplary embodiment of the present invention may include one or two or more additives selected from the group consisting of water-soluble polymers and water-soluble salts.

The polymer composition for preparing a hydrophilic separation membrane according to an exemplary embodiment of the present invention may include 0.1 to 10 wt % of the sulfonated graphene oxide, 0.1 to 10 wt % of the sulfonated carbon nanotubes, 10 to 35 wt % of the sulfonated polyvinylidene fluoride, 0.1 to 15 wt % of the additive, and a balance of a solvent.

In another general aspect, a hydrophilic separation membrane prepared from the polymer composition for preparing a hydrophilic separation membrane according to an exemplary embodiment of the present invention is provided.

The hydrophilic separation membrane according to an exemplary embodiment of the present invention may satisfy the following Equation 1:

$$\frac{2F_S}{F_{SGO} + F_{SCNT}} \geq 1.2 \quad \text{[Equation 1]}$$

wherein $F_S$ is a water flux (L/m$^2$·h) of the hydrophilic separation membrane; $F_{SGO}$ is a water flux (L/m$^2$·h) of a separation membrane including the sulfonated graphene oxide; $F_{SCNT}$ is a water flux (L/m$^2$·h) of a separation membrane including the sulfonated carbon nanotubes.

The hydrophilic separation membrane according to an exemplary embodiment of the present invention may be an ultrafiltration membrane, a microfiltration membrane, a hollow fiber membrane, or a nanofiltration membrane.

Advantageous Effects

The hydrophilic separation membrane prepared using the polymer composition for preparing a hydrophilic separation membrane of the present invention has high hydrophilicity.

The hydrophilic separation membrane prepared using the polymer composition for preparing a hydrophilic separation membrane of the present invention has an excellent water flux.

The hydrophilic separation membrane prepared using the polymer composition for preparing a hydrophilic separation membrane of the present invention has an excellent antifouling property.

The hydrophilic separation membrane prepared using the polymer composition for preparing a hydrophilic separation membrane of the present invention has high porosity.

DESCRIPTION OF DRAWINGS

FIG. 1 is a graph representing an analysis of a sulfonated graphene oxide using X-ray photoelectron spectroscopy.

FIG. 2 is a graph representing an analysis of sulfonated multi-walled carbon nanotubes using X-ray photoelectron spectroscopy.

FIG. 3 is a graph representing an analysis of sulfonated polyvinylidene fluoride using X-ray photoelectron spectroscopy.

FIG. 4 is a scanning electron microphotograph in which a cross section of a filtration membrane prepared in the Examples and the Comparative Examples of the present invention is observed.

BEST MODE

Hereinafter, the polymer composition for preparing a hydrophilic separation membrane according to the present invention will be described in detail with reference to the accompanying drawings. The drawings to be provided below are provided by way of example so that the idea of the present invention can be sufficiently transferred to a person skilled in the art to which the present invention pertains. Therefore, the present invention is not limited to the drawings provided below but may be embodied in many different forms, and the drawings suggested below may be exaggerated in order to clear the spirit of the present invention. Technical terms and scientific terms used herein have the general meaning understood by those skilled in the art to which the present invention pertains unless otherwise defined, and a description for the known function and configuration obscuring the gist of the present invention will be omitted in the following description and the accompanying drawings.

A conventional separation membrane for water treatment largely uses polymer resins such as polyethersulfone or polyvinylidene fluoride for high mechanical strength and good physical properties. However, the polymer resin has problems in that it is difficult for water to be passed therethrough during water treatment due to the hydrophobicity of the polymer resin and the polymer resin is easily contaminated by pollutants contained in a fluid to be treated.

Thus, the present applicant conducted a study for a long period of time for preparing a hydrophilic separation membrane which has an excellent water flux with high hydrophilicity to significantly improve a processing capacity in a real water treatment facility, and may not be easily contaminated to extend a replacement cycle.

As a result of the study, it was found that when a sulfonated graphene oxide and sulfonated carbon nanotubes are mixed in preparation of a separation membrane, even in the case of using a hydrophobic polymer as a base resin, hydrophilicity is excellent, a water flux is significantly improved, and an antifouling property is improved, thereby completing the present invention.

Thus, the present invention relates to
a polymer composition for preparing a hydrophilic separation membrane including a sulfonated graphene oxide, sulfonated carbon nanotubes, and a base resin.

The hydrophilic separation membrane prepared using the polymer composition for preparing a hydrophilic separation membrane of the present invention may have excellent hydrophilicity, a high water flux, an excellent antifouling property, and a high porosity.

Specifically, the hydrophilic separation membrane prepared with the polymer composition for preparing a hydrophilic separation membrane according to an exemplary embodiment of the present invention may have significantly improved hydrophilicity, and more specifically, may have an at least three times higher water flux than that of a separation membrane prepared with only a base resin and an at least 1.2 times higher water flux than a hydrophilic separation membrane including a sulfonated graphene oxide or a hydrophilic separation membrane including sulfonated carbon nanotubes.

In addition, the separation membrane prepared with the polymer composition for preparing a hydrophilic separation membrane according to an exemplary embodiment of the present invention may satisfy the following Equation 1:

$$\frac{2F_S}{F_{SGO} + F_{SCNT}} \geq 1.2 \quad \text{[Equation 1]}$$

wherein $F_S$ is a water flux (L/m$^2$·h) of the hydrophilic separation membrane according to an exemplary embodiment of the present invention; $F_{SGO}$ is a water flux (L/m$^2$·h) of a separation membrane including the sulfonated graphene oxide; $F_{SCNT}$ is a water flux (L/m$^2$·h) of a separation membrane including the sulfonated carbon nanotubes.

Specifically, the hydrophilic separation membrane prepared with the composition for preparing a hydrophilic separation membrane according to an exemplary embodiment of the present invention may have an at least 1.2 times and at most 5 times higher water flux than that of the hydrophilic separation membrane including the same amount of the sulfonated graphene oxide or the same amount of the sulfonated carbon nanotubes. This phenomenon has not been clearly revealed, but is assumed to be due to an interaction with the sulfonated graphene oxide and the sulfonated carbon nanotubes in a polymer composition. Due to the significant improvement of the water flux as described above, the processing capacity per hour may be significantly improved in a water treatment facility to exhibit effects such as space saving and energy saving, and this merit is particularly useful when the separation membrane is practically applied to the water treatment facility.

The separation membrane prepared with the polymer composition for preparing a hydrophilic separation membrane according to an exemplary embodiment of the present invention also has an excellent antifouling property. Specifically, the separation membrane may have an antifouling property improved by 45% or more as compared with a separation membrane prepared using only a base resin and by 8% or more as compared with a separation membrane including only the sulfonated graphene oxide or the sulfonated carbon nanotubes. The improvement of the antifouling property may facilitate cleaning when practically applying the separation membrane in the water treatment facility and extend a replacement cycle to reduce maintenance costs.

The polymer composition for preparing a hydrophilic separation membrane according to an exemplary embodiment of the present invention includes a sulfonated graphene oxide. When the sulfonated graphene oxide is included, the sulfonated graphene oxide significantly improves the hydrophilicity and the antifouling property of the separation membrane together with sulfonated carbon nanotubes described below. Specifically, the sulfonated graphene oxide according to an exemplary embodiment of the present invention may be sulfonated graphene oxide nanoparticles, wherein a particle size is not limited as long as the particles having the size may be attached to the base resin described below to form a separation membrane, but specifically a particle diameter may be 1 to 800 nm.

The sulfonated graphene oxide according to an exemplary embodiment of the present invention may have an atomic ratio of a sulfur atom relative to a carbon atom on a sulfonated graphene oxide surface being 10 to 40%. When a graphene oxide is sulfonated within the above range, an adhesive force to the base resin described below is improved so that the base resin may be stably attached to the separation membrane.

In addition, the sulfonated graphene oxide is not limited as long as the sulfonated graphene oxide is prepared by a method of sulfonating a graphene oxide, but specifically, a method of treating a graphene oxide with sulfuric acid may be used, and more specifically, the graphene oxide may be treated with an 0.1 to 1 M aqueous sulfuric acid solution. In addition, when the graphene oxide is treated with the aqueous sulfuric acid solution, sulfonation may be promoted by a method of ultrasonic irradiation or heating, of course, when treated with the aqueous sulfuric acid solution.

In the polymer composition for preparing a hydrophilic separation membrane according to an exemplary embodiment of the present invention, the sulfonated graphene oxide may be included at 0.1 to 10 wt %, and preferably 1 to 4 wt %, based on the total polymer composition. When the sulfonated graphene oxide is included within the range, the remaining sulfonated graphene oxide which is not attached during preparation of the separation membrane is minimized, while the hydrophilicity of the prepared separation membrane may be significantly improved.

The polymer composition for preparing a hydrophilic separation membrane according to an exemplary embodiment of the present invention includes sulfonated carbon nanotubes. When the sulfonated carbon nanotubes are included, the sulfonated carbon nanotubes significantly improve the hydrophilicity and the antifouling property of the separation membrane together with the sulfonated graphene oxide described above. Here, the carbon nanotubes may be single-walled carbon nanotubes, multi-walled carbon nanotubes, or rope carbon nanotubes, and preferably, may be multi-walled carbon nanotubes. When the sulfonated multi-walled carbon nanotubes are included, an interaction with the sulfonated graphene oxide on the polymer composition occurs more easily so that the carbon nanotubes may be uniformly dispersed in the polymer composition, resulting in formation of a separation membrane which has better hydrophilicity and is stable. Here, a size of the sulfonated carbon nanotubes is not limited as long as the carbon nanotubes having the size may be attached to the base resin to form a separation membrane, but specifically, the carbon nanotubes may have an outer diameter of 10 to 500 nm and a length of 5 to 60 μm.

The sulfonated carbon nanotubes according to an exemplary embodiment of the present invention may have an atomic ratio of a sulfur atom relative to a carbon atom on a carbon nanotube surface being 10 to 40%. When the carbon nanotubes are sulfonated within the range, an adhesive force with the base resin described below is improved and dispersibility is improved by the interaction with the sulfonated graphene oxide, resulting in being uniformly dispersed in the separation membrane to form a stable separation membrane.

Preparation of the sulfonated carbon nanotubes is not limited, as long as the carbon nanotubes are prepared by a method of sulfonating carbon nanotubes, but specifically, a method of treating carbon nanotubes with sulfuric acid may be used, and more specifically, the carbon nanotubes may be treated with an 0.1 to 1 M aqueous sulfuric acid solution. In addition, when the graphene oxide is treated with the aqueous sulfuric acid solution, sulfonation may be promoted by a method of ultrasonic irradiation or heating, of course, when treated with the aqueous sulfuric acid solution.

In addition, in the polymer composition for preparing a hydrophilic separation membrane according to an exemplary embodiment of the present invention, the sulfonated carbon nanotubes may be included at 0.1 to 10 wt %, and preferably 1 to 4 wt %, based on the total polymer composition. When the sulfonated carbon nanotubes are included within the range, the remaining sulfonated carbon nanotubes which are not attached to the base resin during preparation of the separation membrane is minimized, while the hydrophilicity of the prepared separation membrane may be significantly improved.

In the polymer composition for preparing a hydrophilic separation membrane according to an exemplary embodiment of the present invention, the base resin is not limited as long as the base resin is usually used in the separation membrane and is a polymer resin which may be prepared into a separation membrane, including the above-described sulfonated graphene oxide and sulfonated carbon nanotubes. Specifically, the base resin may be one or two or more selected from the group consisting of a hydrophobic halogenated polymer, a hydrophobic polysulfone-based polymer, and a hydrophobic polyolefin-based polymer, and preferably, may be a hydrophobic halogenated polymer. When the hydrophobic halogenated polymer is used as the base resin, the above-described sulfonated graphene oxide or sulfonated carbon nanotubes may be stably present in the membrane.

In the polymer composition for preparing a hydrophilic separation membrane according to an exemplary embodiment of the present invention, the halogenated polymer refers to a polymer compound containing a unit in which one or more hydrogen atom is replaced with halogen atom(s) in the units of the polymer composition. As an example, polyvinylidene fluoride, polytetrafluoroethylene, polyvinyl chloride, or the like may be mentioned, but not limited thereto. In addition, in the polymer composition for preparing a hydrophilic separation membrane according to an exemplary embodiment of the present invention, the polysulfone-based polymer is not limited as long as the polysulfone-based polymer is a polymer compound containing a

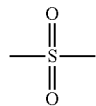

group, and specifically, may be polysulfone, polyethersulfone, or the like, and additionally, the polyolefin is not limited as long as the polyolefin is a polymer composition prepared by polymerizing an olefin-based compound, but specifically, may be polyethylene or polypropylene.

In the polymer composition for preparing a hydrophilic separation membrane according to an exemplary embodiment of the present invention, the base resin may be sulfonated. Specifically, the base resin may be one or two or more selected from the group consisting of a sulfonated halogenated polymer, a sulfonated polysulfone-based polymer, and a sulfonated polyolefin-based polymer, and preferably a base resin which does not contain a sulfone group in the unit may be subjected to sulfonation and included. In the polymer composition for preparing a hydrophilic separation membrane according to an exemplary embodiment of the present invention, when the sulfonated base resin is included, dispersibility is significantly improved with a high interaction with the sulfonated graphene oxide or the sulfonated carbon nanotubes, and the sulfonated graphene oxide or the sulfonated carbon nanotubes are uniformly dispersed in the membrane, thereby significantly improving a water flux as compared with the case of using a base resin which is not sulfonated.

Here, a method of sulfonating the base resin is not limited as long as the method is usually used for subjecting a polymer to sulfonation, but a method of subjecting the base resin to a chlorosulfonic acid at room temperature may be used. Specifically, a chlorosulfonic acid and a base resin may be mixed at room temperature and sulfonated, in which a reaction time may be 1 to 7 hours, but not limited thereto.

In the polymer composition for preparing a hydrophilic separation membrane according to an exemplary embodiment of the present invention, the base resin may be included at 10 to 35 wt %, and preferably 10 to 30 wt %, based on the total polymer composition. When a ratio of the base resin is as described above, a phase transition easily occurs during subsequent preparation of the separation membrane using the polymer composition, thereby forming a stable and uniform separation membrane.

The polymer composition for preparing a hydrophilic separation membrane according to an exemplary embodiment of the present invention may include one or two or more additives selected from the group consisting of water-soluble polymers and water-soluble salts. Specifically, the water-soluble polymer may be polyvinylpyrrolidone, polyethylene glycol, or polyethyleneimine, but is not limited as long as the water-soluble polymer is a polymer composition having a water-soluble property. In addition, the water-soluble salt is not limited as long as the water-soluble salt is dissolved in water, like lithium chloride, sodium chloride, potassium chloride, magnesium chloride, calcium chloride, lithium bromide, sodium bromide, potassium bromide, or the like. However, preferably polyvinylpyrrolidone as the water-soluble polymer and lithium chloride as the water-soluble salt may be used as the additive.

When the water-soluble polymer or the water soluble salt as described above is included, in the preparation of the hydrophilic separation membrane using the polymer composition for preparing a hydrophilic separation membrane according to an exemplary embodiment of the present invention, the water-soluble polymer or the water soluble salt may help formation of pores to form a separation membrane having higher porosity and water flux. In addition, when the water-soluble polymer is used as the additive, pores are uniformly formed on the separation membrane prepared with an interaction with the sulfonated graphene oxide and the sulfonated carbon nanotubes.

In the polymer composition for preparing a hydrophilic separation membrane according to an exemplary embodiment of the present invention, the above-described additive may be included at 0.1 to 15 wt %, and preferably 0.1 to 10 wt %. When the additive is included within the range, pores may be sufficiently secured in the separation membrane to be prepared later and an influence of the additive remaining in the separation membrane on the properties of the separation membrane such as hydrophilicity or a water flux may be minimized.

The polymer composition for preparing a hydrophilic separation membrane according to an exemplary embodiment of the present invention may further include a solvent. Here, the solvent is not limited as long as the solvent is a polar aprotic solvent, but specifically, may be one or two or more selected from the group consisting of N-methyl pyrrolidone, dimethylacetamide, N,N-dimethyl formamide, dimethyl sulfoxide, tetrahydrofuran, ethyl acetate, acetone, and acetonitrile, and more specifically, may be one or two or more selected from the group consisting of N-methyl pyrrolidine, dimethylacetamide, and N,N-dimethylformamide. When the sulfonated graphene oxide, the sulfonated carbon nanotubes, and the base resin are added within the range described above, the solvent may be present in a balance in the polymer composition for preparing a hydrophilic separation membrane, and specifically, may be included at 60 to 85 wt %, based on the total polymer composition for preparing a hydrophilic separation membrane. When the solvent is included within the range described above, the sulfonated graphene oxide and the sulfonated carbon nanotubes are uniformly dispersed, while the separation membrane may be stably prepared later.

Preparation of a separation membrane using the polymer composition for preparing a hydrophilic separation membrane according to an exemplary embodiment of the present invention is not limited as long as the preparation uses a method commonly used in the preparation of the separation membrane, but specifically, the separation membrane may be prepared using a phase transition method. Specifically, a solvent-nonsolvent phase transition method, a thermal induced phase transition method, or a steam induced phase transition method may be used, and more specifically, a solvent-nonsolvent phase transition method may be used. When the solvent-nonsolvent phase transition method is used, the sulfonated graphene oxide and the sulfonated carbon nanotubes are uniformly dispersed to prepare a separation membrane having uniform water flux and antifouling property. Here, a nonsolvent used in the solvent-nonsolvent phase transition method is not limited as long as the nonsolvent is a polar protic solvent, but specifically, may be water.

Hereinafter, the present invention will be described in detail by the following Examples. However, the following Example is only to assist in the understanding of the present invention, and the present invention is not limited to the following Example.

Preparation of Graphene Oxide (GO)

400 ml of a mixed solution having a volume ratio of H2SO4:H3PO4 being 4:1 and 3 g of graphite powder (Daejung, CAS No. 7782-42-5) were mixed, filtered, washed, and then dried to prepare a graphene oxide.

Preparation of Sulfonated Graphene Oxide (SGO)

1 g of the graphene oxide, 20 ml of methanol, and 15 ml of 0.5 M aqueous sulfuric acid solution were mixed and subjected to ultrasonic irradiation for 1 hour to prepare a sulfonated graphene oxide.

Preparation of Sulfonated Multi-Walled Carbon Nanotubes (SMWCNT)

Multi-walled carbon nanotubes (Time Nano, TNMH3 150909, 98+wt %, —OH Functionalized Multi-walled Carbon Nanotubes) having an outer diameter (OD) of 10 to 20 nm and an average length of 10 to 30 μm were prepared. Ig of the prepared multi-walled carbon nanotubes, 20 ml of methanol, and 15 ml of 0.5 M aqueous sulfuric acid solution were mixed and subjected to ultrasonic irradiation for 1 hour to prepare sulfonated multi-walled carbon nanotubes.

Preparation of Sulfonated Polyvinylidene Fluoride (SPVDF)

10 g of polyvinylidene fluoride was dissolved in 80 mL of N-methyl-2-pyrrolidone (NMP), mixed with a chlorosulfuric acid (20 ml), and stirred for 3 hours or more. The base resin was dried by a solvent evaporation method, repeatedly washed with 1,2-dichloroethane, 100% methanol, and water, sequentially, until neutral pH is reached, and dried at 75° C. for 12 hours to prepare sulfonated polyvinylidene fluoride.

EXAMPLE 1

1 g of the sulfonated graphene oxide, 1 g of the sulfonated multi-walled carbon nanotubes, 1 g of polyvinylpyrrolidone, 15 g of polyvinylidene fluoride, and 84 g of N-methyl pyrrolidone were mixed to prepare a mixed solution and stirred for 48 hours or more to be evenly dispersed.

The prepared mixed solution was allowed to stand at room temperature for 9 hours or more to remove bubbles, applied to a glass plate using a casting knife at a thickness of 150 to 250 μm, and immersed in a coagulation bath composed of water at 15 to 25° C. The immersed separation membrane was cleaned with water at 50° C. for 30 minutes to prepare a hydrophilic separation membrane (PVDF-SGO-SMWCNT).

EXAMPLE 2

A hydrophilic separation membrane (SPVDF-SGO-SMWCNT) was prepared in the same manner as in Example 1, except that the same amount of sulfonated polyvinylidene fluoride was mixed instead of polyvinylidene fluoride.

COMPARATIVE EXAMPLE 1

15 g of polyvinylidene fluoride, 1 g of polyvinylpyrrolidone, and 84 g of N-methyl pyrrolidone were mixed to prepare a mixed solution.

The prepared mixed solution was immersed in water in the same manner as in Example 1 to prepare a separation membrane (PVDF).

COMPARATIVE EXAMPLE 2

A separation membrane (PVDF-SGO) was prepared in the same manner as in Example 1, except that the same amount of sulfonated graphene oxide was mixed instead of the sulfonated multi-walled carbon nanotubes.

COMPARATIVE EXAMPLE 3

A separation membrane (PVDF-SMWCNT) was prepared in the same manner as in Example 1, except that the same amount of sulfonated multi-walled carbon nanotubes were mixed instead of the sulfonated graphene oxide.

[Confirmation of Sulfonation of Graphene Oxide, Carbon Nanotube, and Polyvinylidene Fluoride]

Sulfonation degrees of the sulfonated graphene oxide (FIG. 1), the sulfonated carbon nanotubes (FIG. 2), and the sulfonated polyvinylidene fluoride (FIG. 3) were confirmed, respectively, using X-ray photoelectron spectroscopy.

Experimental equipment: K-Alpha, Thermo Scientific, UK

Analysis method: aluminum Kα line was used as an X-ray source, and energy of 30 eV was irradiated.

Analysis software: Thermo Scientific Advantage software, ver 5.932

[Observation of Cross Section of Prepared Separation Membrane]

Cross sections of the separation membranes of Example 1 (a), Example 2 (b), Comparative Example 2(d), and Comparative Example 3 (e) were observed with a scanning electron microscope and shown in FIG. 4, and as the experimental equipment, CSPM 5500 available from AFM was used.

[Water Flux Experiment]

Water fluxes of Examples 1 to 3 and Comparative Examples 1 to 3 were measured using a self-produced, cross-flow filtration reactor. As the used cross-flow filtration reactor, equipment having an inner diameter of 6 cm and an internal effective area of 28.26 cm2 was used. After a membrane was mounted on the water flux equipment, operation was performed at a pressure of 0.15 MPa and the water flux of each of the separation membranes per time and area was measured and shown in Table 1. In addition, when the water flux of Comparative Example 1 is set as 100, the water fluxes of the Examples and Comparative Examples other than Comparative Example 1 were converted and shown in Table 1.

Referring to Table 1, it was confirmed that the water fluxes of the Examples were significantly higher than those of the separation membranes including only the sulfonated graphene oxide or the sulfonated carbon nanotubes.

TABLE 1

| Separator | Water flux (L/m²·h) | Converted water flux |
|---|---|---|
| Example 1 (PVDF-SGO-SMWCNT) | 810 | 279 |
| Example 2 (SPVDF-SGO-SMWCNT) | 890 | 307 |
| Comparative Example 1 (PVDF) | 290 | 100 |
| Comparative Example 2 (PVDF-SGO) | 740 | 255 |
| Comparative Example 3 (PVDF-SMWCNT) | 680 | 234 |

[Antifouling Experiment]

The antifouling experiment of each of the separation membranes was divided into three stages and conducted. After each of the separation membranes was mounted on the cross-flow filtration reactor, the water flux was measured while distilled water was passed therethrough for 30 minutes (first water flux). Thereafter, 0.5 g/l of a bovine serum albumin (BSA) solution was passed through each of the separation membranes, and then the water flux of each of the separation membranes for distilled water was measured again for 30 minutes (second water flux). Based on the resulted measured values, the antifouling property of Examples 1 to 3 and Comparative Examples 1 to 3 was calculated using the following Equation 2 and shown in Table 2.

Referring to Table 2, it was confirmed that the antifouling property of the separation membrane of the present invention was significantly improved as compared with the separation membrane including only the sulfonated graphene oxide or the sulfonated carbon nanotubes.

$$\text{(Antifouling property)} = \frac{\text{(Second water flux)}}{\text{(First water flux)}} \times 100 \qquad \text{[Equation 2]}$$

TABLE 2

| Separator | Antifouling property |
|---|---|
| Example 1 (PVDF-SGO-SMWCNT) | 90% |
| Example 2 (SPVDF-SGO-SMWCNT) | 92% |
| Comparative Example 1 (PVDF) | 50.3% |
| Comparative Example 2 (PVDF-SGO) | 82% |
| Comparative Example 3 (PVDF-SMWCNT) | 80% |

The invention claimed is:

1. A polymer composition for preparing a hydrophilic separation membrane, comprising: a sulfonated graphene oxide, sulfonated carbon nanotubes, and a base resin, wherein the base resin is one or two or more selected from the group consisting of a hydrophobic halogenated polymer, a hydrophobic polysulfone-based polymer, and a hydrophobic polyolefin-based polymer; based on the total mass of the composition, the sulfonated graphene oxide is included in 1 to 4 wt. %, and the sulfonated carbon nanotubes is included in 1 to 4 wt. %; and wherein the hydrophilic separation membrane satisfies the following Equation 1:

$$\frac{2F_S}{F_{SGO} + F_{SCNT}} \geq 1.2 \qquad \text{[Equation 1]}$$

wherein $F_S$ is a water flux (L/m²·h) of the hydrophilic separation membrane; $F_{SGO}$ is a water flux (L/m²·h) of a separation membrane including a sulfonated graphene oxide; $F_{SCNT}$ is a water flux (L/m²·h) of a separation membrane including sulfonated carbon nanotubes.

2. The polymer composition for preparing a hydrophilic separation membrane of claim 1, wherein the sulfonated graphene oxide has an atomic ratio of sulfur atoms relative to carbon atoms on a surface thereof being 10 to 40%.

3. The polymer composition for preparing a hydrophilic separation membrane of claim 1, wherein the sulfonated carbon nanotubes have an atomic ratio of sulfur atoms relative to carbon atoms on a surface of the carbon nanotubes being 10 to 40%.

4. The polymer composition for preparing a hydrophilic separation membrane of claim 1, wherein the sulfonated carbon nanotubes are sulfonated multi-walled carbon nanotubes.

5. The polymer composition for preparing a hydrophilic separation membrane of claim 1, wherein the base resin includes sulfonated polyvinylidene fluoride.

6. The polymer composition for preparing a hydrophilic separation membrane of claim 5, further comprising: one or two or more additives selected from the group consisting of water-soluble polymers and water-soluble salts.

7. The polymer composition for preparing a hydrophilic separation membrane of claim 6, wherein the composition comprises 10 to 35 wt % of the sulfonated polyvinylidene fluoride, 0.1 to 15 wt % of the additive, and a balance of a solvent.

8. A hydrophilic separation membrane prepared with the polymer composition for preparing a hydrophilic separation membrane of claim 1.

9. The hydrophilic separation membrane of claim 8, wherein the hydrophilic separation membrane is an ultrafiltration membrane, a microfiltration membrane, a hollow fiber membrane, or a nanofiltration membrane.

* * * * *